US011072119B2

(12) United States Patent
Busato et al.

(10) Patent No.: US 11,072,119 B2
(45) Date of Patent: Jul. 27, 2021

(54) CARTRIDGE FOR FEEDING A STEREOLITHOGRAPHY MACHINE AND STEREOLITHOGRAPHY MACHINE EMPLOYING SAID CARTRIDGE

(71) Applicant: DWS S.R.L., Thiene (IT)

(72) Inventors: Renzo Busato, Marano Vicentino (IT); Alberto Muraro, Camporovere di Roana (IT)

(73) Assignee: DWS S.R.L., Thiene (IT)

( * ) Notice: Subject to any disclaimer, the term of this patent is extended or adjusted under 35 U.S.C. 154(b) by 178 days.

(21) Appl. No.: 16/484,383

(22) PCT Filed: Jan. 25, 2018

(86) PCT No.: PCT/IB2018/050461
§ 371 (c)(1),
(2) Date: Aug. 7, 2019

(87) PCT Pub. No.: WO2018/146568
PCT Pub. Date: Aug. 16, 2018

(65) Prior Publication Data
US 2021/0023787 A1    Jan. 28, 2021

(30) Foreign Application Priority Data
Feb. 10, 2017  (IT) .......... 102017000015055

(51) Int. Cl.
*B29C 64/259*  (2017.01)
*B33Y 30/00*  (2015.01)
(Continued)

(52) U.S. Cl.
CPC .......... *B29C 64/259* (2017.08); *B29C 64/264* (2017.08); *B29C 64/321* (2017.08); *B33Y 30/00* (2014.12); *B29C 64/124* (2017.08)

(58) Field of Classification Search
CPC ... B29C 64/124; B29C 64/129; B29C 64/135; B29C 64/255; B29C 64/259;
(Continued)

(56) References Cited

U.S. PATENT DOCUMENTS

| 5,147,323 A | * | 9/1992 | Haber | ............... | A61M 5/19 |
| | | | | | 604/191 |
| 5,922,364 A | * | 7/1999 | Young, Jr. | .......... | B33Y 30/00 |
| | | | | | 425/174.4 |

(Continued)

FOREIGN PATENT DOCUMENTS

| JP | 2012111655 | 7/2014 |
| WO | 2014016668 | 7/2013 |
| WO | 2016172788 | 3/2016 |

OTHER PUBLICATIONS

International Search Report regarding PCT/IB2018/050461, dated Mar. 4, 2018 (3pgs.).

(Continued)

*Primary Examiner* — Joseph S Del Sole
*Assistant Examiner* — Manley L Cummins, IV
(74) *Attorney, Agent, or Firm* — Volpe Koenig (57) ABSTRACT

The invention is a cartridge (1, 100) for stereolithography machines (200), which comprises a supporting structure (3) provided with connection means (10) suited to removably connect it to the stereolithography machine (200), a first reservoir (5) suited to contain a material (M1, M2) and provided with a first duct (8) and with a delivery mouth (81) which are suited to place it in communication with a container (4), a feeding unit (7) suited to feed the material (M1, M2) from the first reservoir (5) to the container (4), shutter means (9) suited to close the delivery mouth (81) of the first duct (8), and a second reservoir (12) suited to contain the material (M1, M2). The cartridge (1, 100) furthermore comprises a second duct (13) interposed (Continued)

between the first reservoir (5) and the second reservoir (12) in such a way as to place them in communication with each other. The feeding unit (7) is configured so that it conveys the material (M1, M2) from the first reservoir (5) to the second reservoir (12) and vice versa through the second duct (13) when the shutter means (9) are in the position in which they close the delivery mouth (81).

10 Claims, 7 Drawing Sheets

(51) Int. Cl.
  *B29C 64/264* (2017.01)
  *B29C 64/321* (2017.01)
  *B29C 64/124* (2017.01)

(58) Field of Classification Search
  CPC ... B29C 64/264; B29C 64/321; B29C 64/336; B29C 64/343; B33Y 30/00; G03F 7/70416
  See application file for complete search history.

(56) References Cited

U.S. PATENT DOCUMENTS

| | | |
|---|---|---|
| 2013/0075954 A1 | 3/2013 | Gregory, II et al. |
| 2017/0129167 A1* | 5/2017 | Castanon ............... B29C 64/245 |
| 2017/0172765 A1* | 6/2017 | Solorzano ............. B33Y 70/00 |
| 2018/0169947 A1* | 6/2018 | Jessen .................... B29C 64/188 |

OTHER PUBLICATIONS

Written Opinion of the International Searching Authority regarding PCT/IB2018/050461, dated Mar. 4, 2018 (5pgs.).

* cited by examiner

CARTRIDGE FOR FEEDING A STEREOLITHOGRAPHY MACHINE AND STEREOLITHOGRAPHY MACHINE EMPLOYING SAID CARTRIDGE

The present invention concerns an improved cartridge for feeding a stereolithography machine, as well as a stereolithography machine employing said cartridge.

The invention concerns also a method for mixing a material by means of said improved cartridge before proceeding to feed the stereolithography machine with said material.

As is known, the stereolithography technique makes it possible to produce a three-dimensional object by superimposing a plurality of layers of a liquid or pasty material which is solidified through exposure to predefined radiation, generally light radiation.

A stereolithography machine of the known type comprises a container suited to hold the material and a modelling platform which is powered so that it moves in the vertical direction.

The machine comprises also emitter means suited to emit said predefined radiation, which are capable of selectively solidifying a layer of the material adjacent to the modelling platform.

Different stereolithography materials suited to be used to make the object are known, which differ from one another in terms of colour, shade, mechanical characteristics and other physical parameters.

The same stereolithography machine can be used with any of the different materials mentioned above, depending on the requirements set for each individual three-dimensional object to be made.

In particular, it is known that during the execution of the stereolithography process for the production of a three-dimensional object there is the need to top up the material held in the container, in such a way as to maintain its level constant.

Analogously, it is possible to use different materials for different areas of the same three-dimensional object, adding said materials at different moments during the production of the object itself.

However, both of the operations just described above pose the drawback that they take time and are relatively uncomfortable to carry out, as they must be performed manually by an operator.

According to a known variant embodiment, the material present in the container is topped up or different materials are introduced in the same container automatically, which is obtained by equipping the stereolithography machine with a feeding device.

However, also this last variant embodiment, according to which the material is topped up automatically, poses a recognized drawback. In fact, since these stereolithography machines must convey a material into said container autonomously during the stereolithography process, they are provided with a reservoir from which said material can be withdrawn. Since the use of materials obtained by mixing several components having different mechanical characteristics and different specific weights is becoming increasingly frequent is in the field of stereolithography, inside said reservoir the heavier particles present in the material tend to sediment on the bottom and to separate from the more liquid part of the material itself. Therefore, to disadvantage, it is very likely that at the moment when it were necessary to convey a predefined quantity of material from the reservoir into the container, only the liquid part of the material itself would be conveyed into said container.

This would disadvantageously lead to the production of a three-dimensional object with mechanical characteristics that would be different and, in most cases, worse than those established in advance.

In other words, it is known that in the case of use of said types of materials it is necessary to mix them and restore a condition of homogeneity before conveying them into the container in order to make the three-dimensional object.

A further drawback posed by the stereolithography machines of the known type is related to the fact that during the processing cycle the transparent bottom of the container is exposed to the predefined radiation, thus being subjected to progressive opacification.

Said opacification progressively reduces the effectiveness of the radiation, until making it necessary to replace the container.

The determination of the moment when it is necessary to carry out said operation of replacement requires a certain degree of expertise.

Therefore, the difficulties related to the topping up or to the introduction of different materials in the container and to the emptying of the latter, to the periodical replacement of the container itself and to the cleaning of the feeding system, if required, imply that a machine of the type described above is not suited to be used by inexpert users.

The document WO2015015261 describes a cartridge for a stereolithography machine, comprising a container provided with an access opening, a first reservoir suited to contain a first liquid or pasty material, a second reservoir suited to contain a second liquid or pasty material and feeding means suited to convey the first material and the second material from the reservoirs towards the container.

The present invention intends to overcome all of the drawbacks posed by the cartridges and the stereolithography machines of known type described above. In particular, it is a first object of the invention to make it easier for the operator to use different materials in the same stereolithography machine.

It is a further object of the invention to prevent the material introduced in the processing container from having mechanical characteristics, colour characteristics or other physical parameters different from the original ones of the material itself.

In particular, it is the object of the invention to make it possible to effectively mix the material suited to be introduced in said container before proceeding to the production of the three-dimensional object.

The objects described above are achieved by a cartridge for a stereolithography machine made according to claim 1.

The objects described above are also achieved by a stereolithography machine comprising said cartridge, as well as by a mixing method.

Further characteristics and details of the various aspects of the invention are described in the dependent claims.

Advantageously, the cartridge which is the subject of the invention facilitates the production of three-dimensional objects with different materials for different areas of the object.

In particular, since for making some types of three-dimensional objects, such as dental prostheses, during the stereolithography process it is necessary to gradually introduce a second material containing coloured pigments into a first type of base material already present in said container, in order to progressively vary the colour or shade of the object being made, the cartridge of the invention advantageously makes it possible to facilitate said gradual introduction, while at the same time maintaining the original chromatic and mechanical characteristics of the materials used.

Still advantageously, the cartridge of the invention makes it possible to avoid the need to clean the feeding system of the container.

A further advantage lies in that the replacement of the container is made easier at the moment when the bottom of the container itself has opacified.

Still advantageously, said cartridge is particularly suited to be used also by an inexpert operator, such as, for example, an operator working in the field of jewellery or dentistry.

The objects and the advantages described above, together with others which will be illustrated below, are highlighted in the description of some preferred embodiments of the invention which are provided by way of non-limiting example with reference to the drawings attached hereto, wherein.

Figure 1:
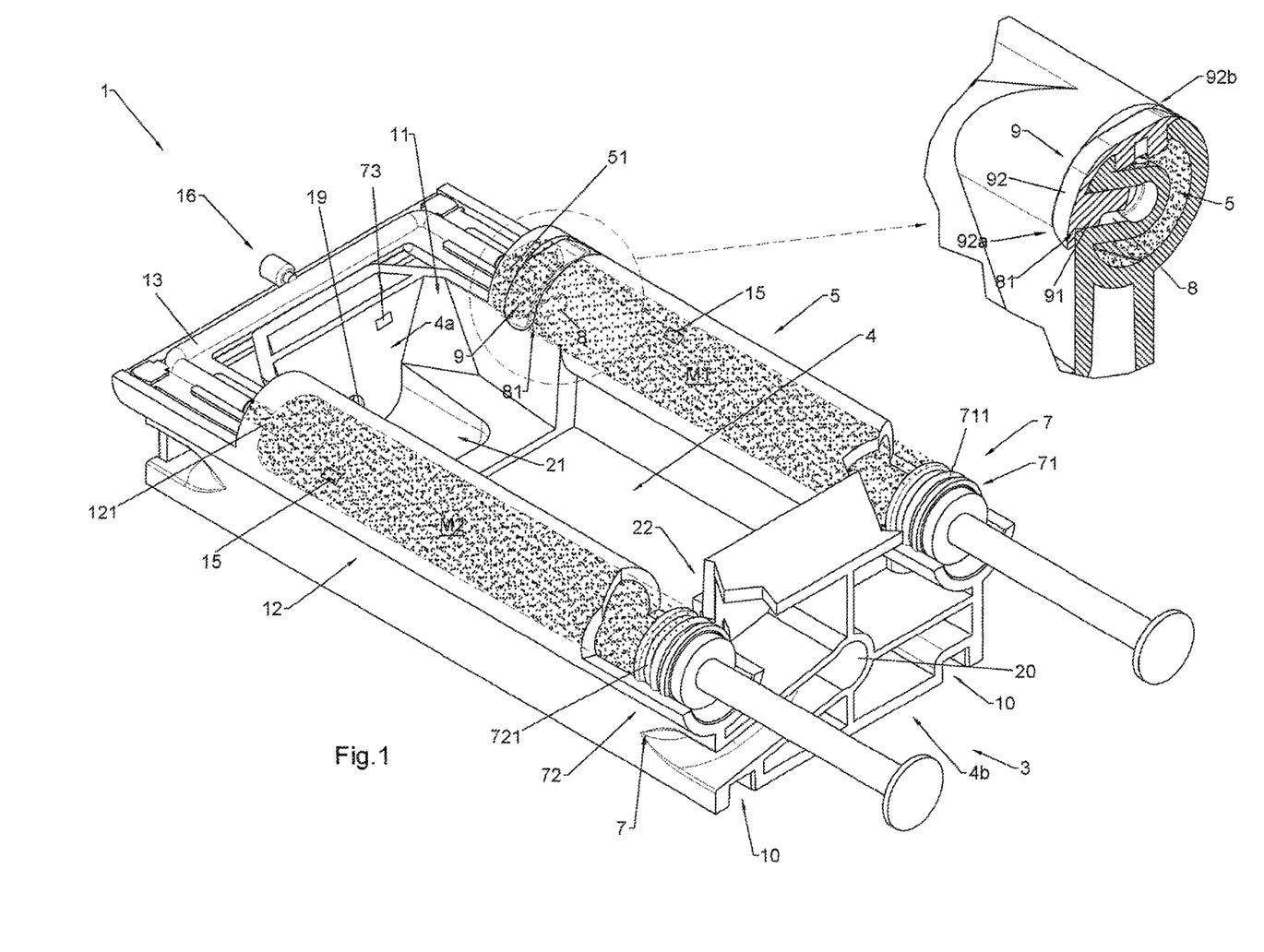
FIG. 1 shows an axonometric view of the cartridge which is the subject of the invention according to a first embodiment.
Figure 2:
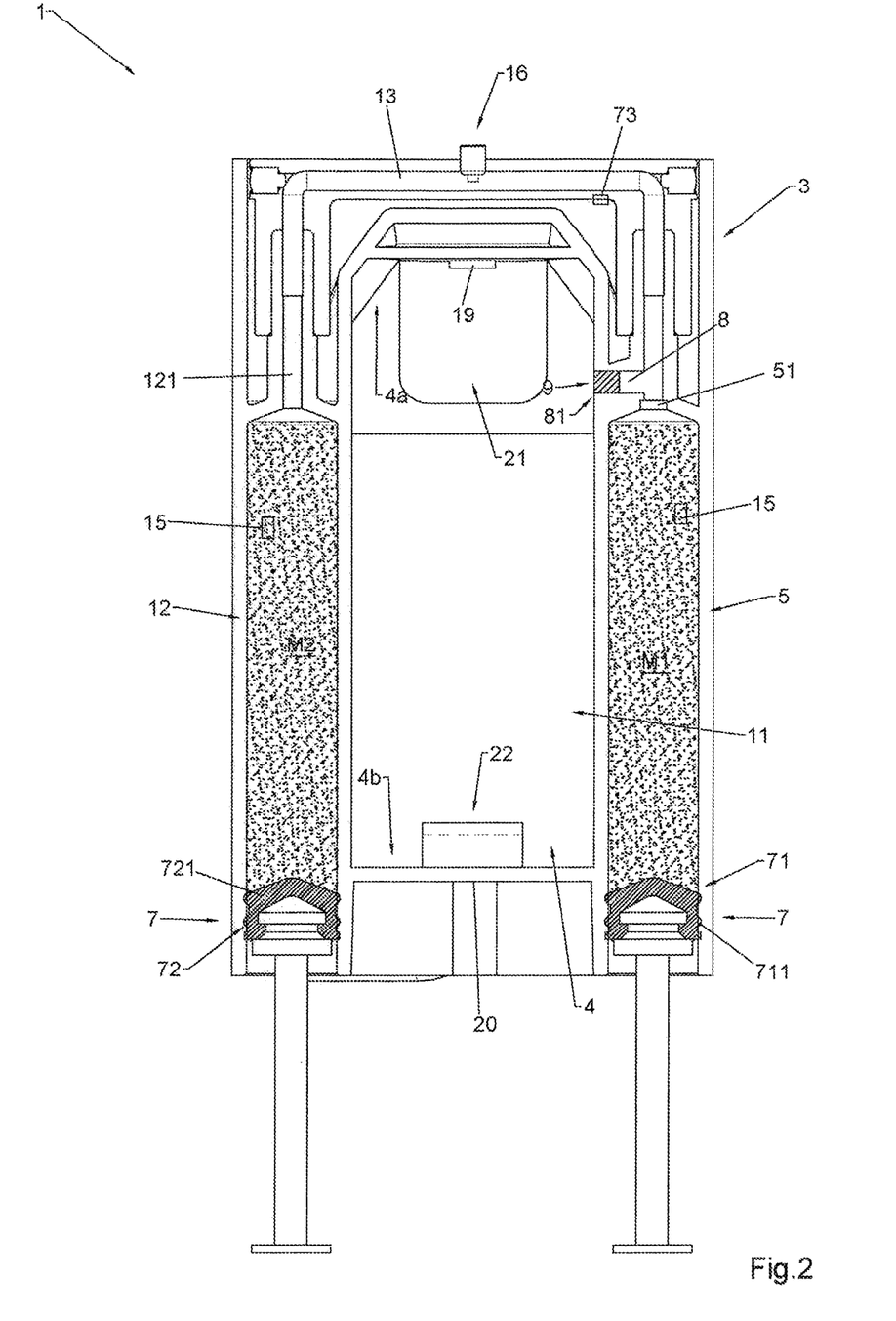
FIG. 2 shows a top view of the cartridge of the invention according to the first embodiment illustrated in FIG. 1.

According to a first preferred embodiment indicated as a whole by 1 in FIGS. 1 and 2, the cartridge of the invention for feeding a stereolithography machine comprises a supporting structure 3 with which a container 4 is associated.

It cannot be excluded, however, that in alternative embodiments to said first preferred embodiment of the invention, said container 4 may not belong to the cartridge 1 of the invention, but rather may be a separate element inserted independently in a stereolithography machine 200 and operatively associated with the same cartridge 1 in the operating configuration.

The cartridge 1 furthermore comprises a first reservoir 5 associated with the supporting structure 3 and suited to contain a first liquid or pasty material M1 suited to be solidified through exposure to predefined radiation R. Said first reservoir 5 is in communication with the container 4 through a first duct 8 facing towards said container 4 through a delivery mouth 81.

Obviously, according to the alternative embodiments of the cartridge 1 of the invention which do not include the presence of the container 4, the first duct 8 must be configured so that it can be operatively associated with an independent container when the first duct 8 and said independent container are both installed in the stereolithography machine 200 in their operating configuration.

Preferably but not necessarily, said first material M1 is a light hardening resin or a photopolymer and the predefined radiation R is light.

Furthermore, the cartridge 1 is provided with shutter means 9 suited to close the delivery mouth 81 of said first duct 8, in the manner described in detail below.

The cartridge 1 furthermore comprises a feeding unit 7 which is associated with the supporting structure 3 and suited to convey the first material M1 from the first reservoir 5 towards the container 4.

Figure 4:
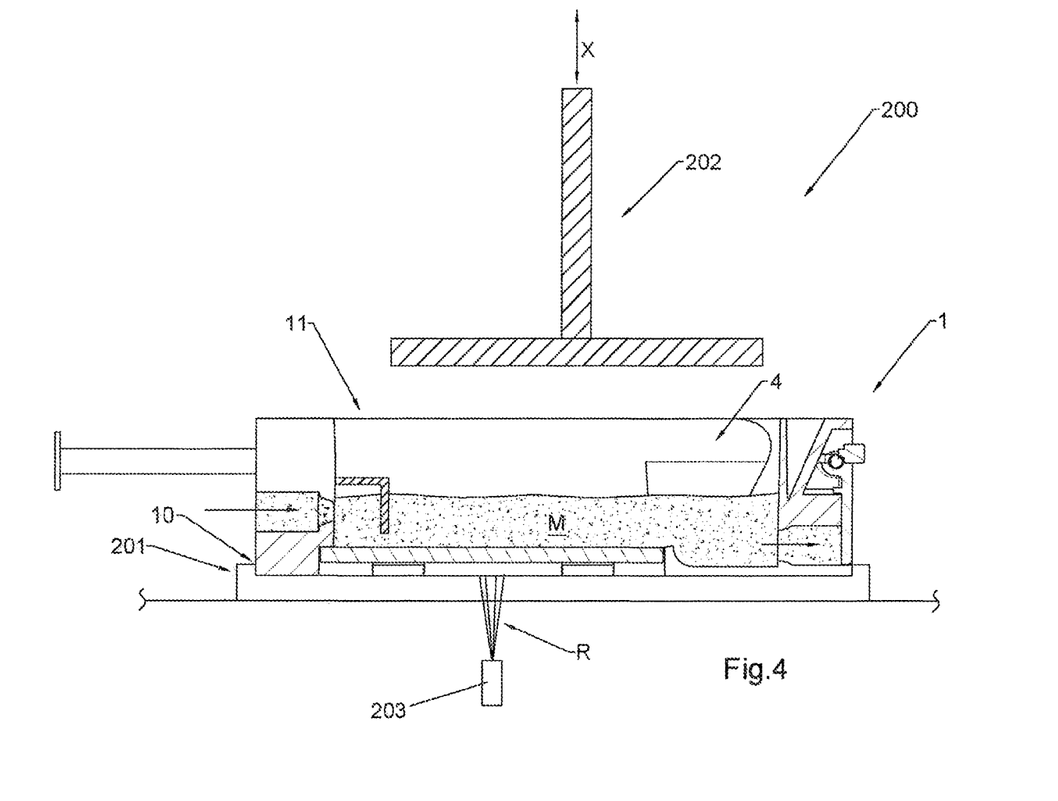
FIG. 4 shows a schematic view of a stereolithography machine according to the invention configured to house the cartridge of the invention.

The supporting structure 3 is provided with removable connection means 10 suited to connect it to a stereolithography machine 200, schematically illustrated in FIG. 4.

The stereolithography machine 200 is in turn provided with removable connection means 201 suited to cooperate with said connection means 10 of the cartridge 1 in such a way as to define for the latter an operating configuration illustrated in FIG. 4.

The container 4 is also provided with an access opening 11 suited to allow the insertion of the modelling platform 202 of the stereolithography machine 200 in the container 4 itself when the cartridge 1 is connected to the stereolithography machine, as shown in FIG. 4.

It can be understood that the coupling of the cartridge 1 with the machine 200 makes it possible to have a container 4 suited to hold the material M which, when selectively subjected to the predefined radiation R generated by emitter means 203 belonging to the stereolithography machine 200, solidifies in such a way as to shape the three-dimensional object.

Advantageously, said cartridge 1 can be easily coupled with the machine 200 and replaced when necessary.

Obviously, different cartridges with analogous structures can be carried out, thus all equally suited to be connected to the machine 200 but different from one another due to the material they contain.

Therefore, advantageously, the operator can select from time to time the cartridge containing the material which is most suitable for the specific three-dimensional object to be produced.

According to the invention, the cartridge 1 comprises also a second reservoir 12 which is associated with the supporting structure 3 and suited to contain the same material M1 contained in the first reservoir 5 or a second liquid or pasty material M2 of a type different from the one contained in the first reservoir 5, provided that also said second material M2 is capable of being solidified through exposure to predefined radiation R. In other words, the second material M2 must be of the type suited to be mixed with the first material M1 in such a way as to form a mixture of material M capable of solidifying following exposure to said predefined radiation R.

For example, the first material M1 may serve as a base material for the formation of the solidified layers of the three-dimensional object, while the second material M2 may serve as an auxiliary material to form, together with the base material M1, a mixture of material M having different physical properties compared to the base material M1.

In even greater detail, said second material M2 can be, for example, a pigment, in the case where it is necessary to obtain a mixture of material M having different colours shades, tones or other visual properties.

In addition or as an alternative to the above, said second material M2 may also contain powders, for example ceramic particles, suited to give special mechanical characteristics, in terms of resistance, hardness and the like, to the mixture of material M.

It should be noted that, differently from what has been described above, the cartridge 1 of the invention may be used introducing said second material M2 in the first reservoir 5 and the same second material M2 or, alternatively, the first material M1 in the second reservoir 12.

It can be understood, finally, that the presence of several materials M1, M2 different from one another in a single cartridge 1 allows three-dimensional objects made of different materials to be produced.

Furthermore, since through a single operation the operator can connect to the stereolithography machine 200 the cartridge 1 which is most suitable for the type of product to be obtained, the preparation of the stereolithography machine 200 is simpler and quicker compared to the machines of the known type.

Obviously, for each type of three-dimensional object to be obtained a specific cartridge can be produced, containing the materials which are most suitable for that type of object.

As regards said two reservoirs 5 and 12, the volume of each one of them is preferably but not necessarily included between 1 cm$^3$ and 50 cm$^3$.

The volume specified above corresponds to the quantity of material M1, M2 which is sufficient to produce a dental model of the type used in dental technology.

Therefore, advantageously, a cartridge 1 with reservoirs 5, 12 having the size indicated above can be used as a disposable cartridge, further simplifying the use of the machine for an inexpert operator, while at the same time limiting the quantity of material M1, M2 to the minimum quantity required.

Obviously, the volumes of the reservoirs 5, 12 can be different from those specified above and/or different from each other.

It cannot be excluded that according to variant embodiments of the invention the cartridge 1 may comprise two or more second reservoirs 12, in such a way that the same cartridge 1 may comprise three or more materials Mn.

According to the invention, the cartridge 1 furthermore comprises a second duct 13 which is interposed between the first reservoir 5 and the second reservoir 12, in such a way as to place them in communication with each other. According to the invention, the feeding unit 7 is configured also to convey the material or the materials M1, M2 contained in the first reservoir 5 towards the second reservoir 12 and, vice versa, to convey the material or the materials M1, M2 contained in the second reservoir 12 towards the first reservoir 5 through said second duct 13. In particular, as described in greater detail below, the feeding unit 7 is configured so that these last operations are performed when the shutter means 9 are arranged in the position in which they close said delivery mouth 81.

Advantageously, the fact of conveying the material or the materials M1, M2 once or more than once from one reservoir to the other through said second duct 13, without allowing said materials to flow out towards the container 4, makes it possible to mechanically move the different components of said materials, so that their composition is conveniently homogeneous.

In other words, said mechanical mixing operation makes it possible to amalgamate the heavier components of a given material, probably sedimented on the bottom of one of the two reservoirs 5 or 12, with the more liquid components before dispensing the same material into said container 4. The main object of the invention is thus considered achieved.

As described in detail below and as mentioned above, said feeding unit 7 furthermore makes it possible to transfer the material M1 or M2 contained in the first reservoir 5 into the container 4 in a single passage or, alternatively, as it is needed for the processing cycle, previously freeing said delivery mouth 81 of the shutter means 9.

According to said first preferred embodiment of the invention, the first reservoir 5 and the second reservoir 12 are defined as distinct from each other and they are both substantially in the shape of a hollow cylinder, as shown in FIGS. 1 and 2.

According to said preferred embodiment, furthermore, the feeding unit 7 comprises first pushing means 71, preferably a first plunger 711, introduced and suited to slide inside the first reservoir 5, as well as first actuator means, not illustrated in the figures, configured to move said first pushing means 71. Furthermore, the feeding unit 7 is provided with second pushing means 72, preferably a second plunger 721, introduced and suited to slide inside the second reservoir 12, as well as second actuator means, not illustrated in the figures, either, configured to move said second plunger 721 along the second reservoir 12.

Preferably, said two actuator means are configured to move the respective plungers 711 and 721 independently of each other.

The usefulness of this last feature will be clarified below during the description of the method which is the subject of the invention.

It cannot be excluded that in variant embodiments of the invention the two reservoirs 5 and 12 can be defined as having a shape different from the hollow cylindrical shape and that said pushing means 71 and 72 can be of a different type with respect to the plungers 711 and 721, provided that the same pushing means 71 and 72 are capable of conveying the materials M1, M2 from one reservoir to the other.

Preferably, said first and said second actuator means are controlled through external control means, preferably belonging to the stereolithography machine 200 and configured so that they control the flow of the materials M1, M2 between the reservoirs 5 and 12 and towards the container 4.

According to a variant embodiment of the invention, also said first and said second actuator means may belong to the stereolithography machine 200 in which the cartridge 1 is installed.

According to said first preferred embodiment of the cartridge 1, the two reservoirs 5 and 12 and the container 4 are associated with one another in a non removable manner through the supporting structure 3, in such a way as to form a single piece.

Even more preferably, the supporting structure 3 is configured in such a way as to define the reservoirs 5 and 12 and the container 4.

It cannot be excluded, however, that according to construction variants of said first preferred embodiment of the invention the two reservoirs 5 and 12 and/or the container 4 may be removably connected to the supporting structure 3.

Figure 3:
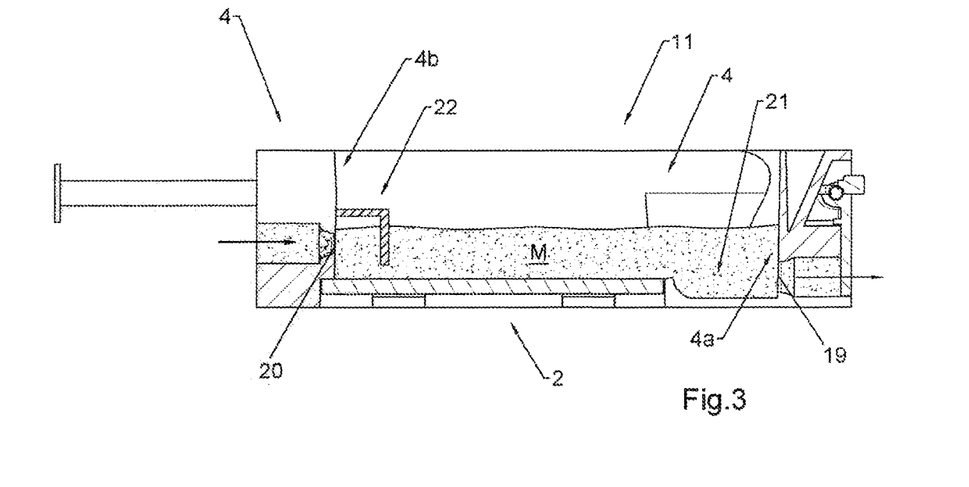
FIG. 3 shows the container belonging to the cartridge shown in FIGS. 1 and 2 according to a longitudinal section plane.

Preferably, and as shown in FIG. 3, the bottom 2 of the container 4 is at least partially transparent to the predefined radiation R and located opposite its access opening 11.

The configuration of the access opening 11 and of the transparent bottom 2 makes it possible to use the cartridge 1 in a stereolithography machine 200 of the type schematically illustrated in FIG. 4, where the predefined radiation R is irradiated by emitter means 203 arranged under the container 4.

In fact, the transparent bottom 2 allows the predefined radiation R to pass therethrough, so as to obtain the solidification of the material M contained in the container 4.

Furthermore, the access opening 11 allows the modelling platform 202 to be introduced in the container 4 and to be moved along the axis X, so that it is possible to carry out the stereolithography process.

Furthermore, in all of the embodiments described above, the feeding unit 7 may comprise sensors 73 suited to detect the level of the material M held in the container 4 and configured to signal any anomalous levels.

Preferably, the sensors 73 are operatively connected to the actuator means, in such a way as to control their action.

Preferably, the cartridge 1 comprises also means 15 for detecting the level of the materials M1, M2 contained in the reservoirs 5, 12.

Said detection means 15 make it possible to indicate when the materials M1, M2 contained in the reservoirs 5, 12 are about to run out, so that the operator can replace the cartridge 1 when necessary.

Advantageously, the detection means 15 further facilitate the use of the stereolithography machine 200.

Obviously, said detection means 15 can be advantageously used also in feeding units incorporated in a stereolithography machine 200, in order to signal the need to top up the reservoirs 5, 12.

Preferably, the detection means 15 are configured so that they emit electric signals intended to indicate the levels of the materials M1, M2 contained in the reservoirs 5, 12.

Said electric signals are preferably transmitted to a device located outside the cartridge 1 through connection means which may comprise, for example, a first connector suited to be removably connected to a second connector belonging to the stereolithography machine 200.

The stereolithography machine 200 is preferably equipped with signalling means, not illustrated herein but known per se, configured in such a way that they send a warning to the operator when the materials M1, M2 are about to run out in the respective reservoirs 5, 12 on receipt of said electric signal.

Regarding the preferred embodiment of the invention, the second duct 13 is removably connected to a first connection element 51 defined on the first reservoir 5 and to a second connection element 121 defined on the second reservoir 12, in such a way as to allow said second duct 13 to be released from one or both of the reservoirs 5 and 12. Advantageously, said characteristic makes it easier to top up the material in the two reservoirs 5 and 12, if necessary.

It cannot be excluded, however, that said second duct 13 may be associated with the two reservoirs 5 and 12 in a non removable manner.

The cartridge 1 of the invention preferably comprises also a removable closing element 16 arranged along the second duct 13 in order to temporarily shut the latter and thus prevent the passage of the materials M1 and M2 from the first reservoir 5 to the second reservoir 12, and vice versa.

Even more preferably, said closing element 16 is a removable clip suited to shut said second duct 13 and thus to prevent the flow of the materials M1 and M2 from one reservoir to the other before the installation and the use of the cartridge 1 of the invention. According to possible variant embodiments of the invention, said closing element 16 may be of another type known per se, provided that it is capable of temporarily closing said second duct 13. For example, said closing element 16 may be a valve arranged along the second duct 13 and suited to be operated manually or by means of said external control elements.

Furthermore, according to different embodiments of the cartridge 1 of the invention, said closing element 16 may not be present.

Figure 5:
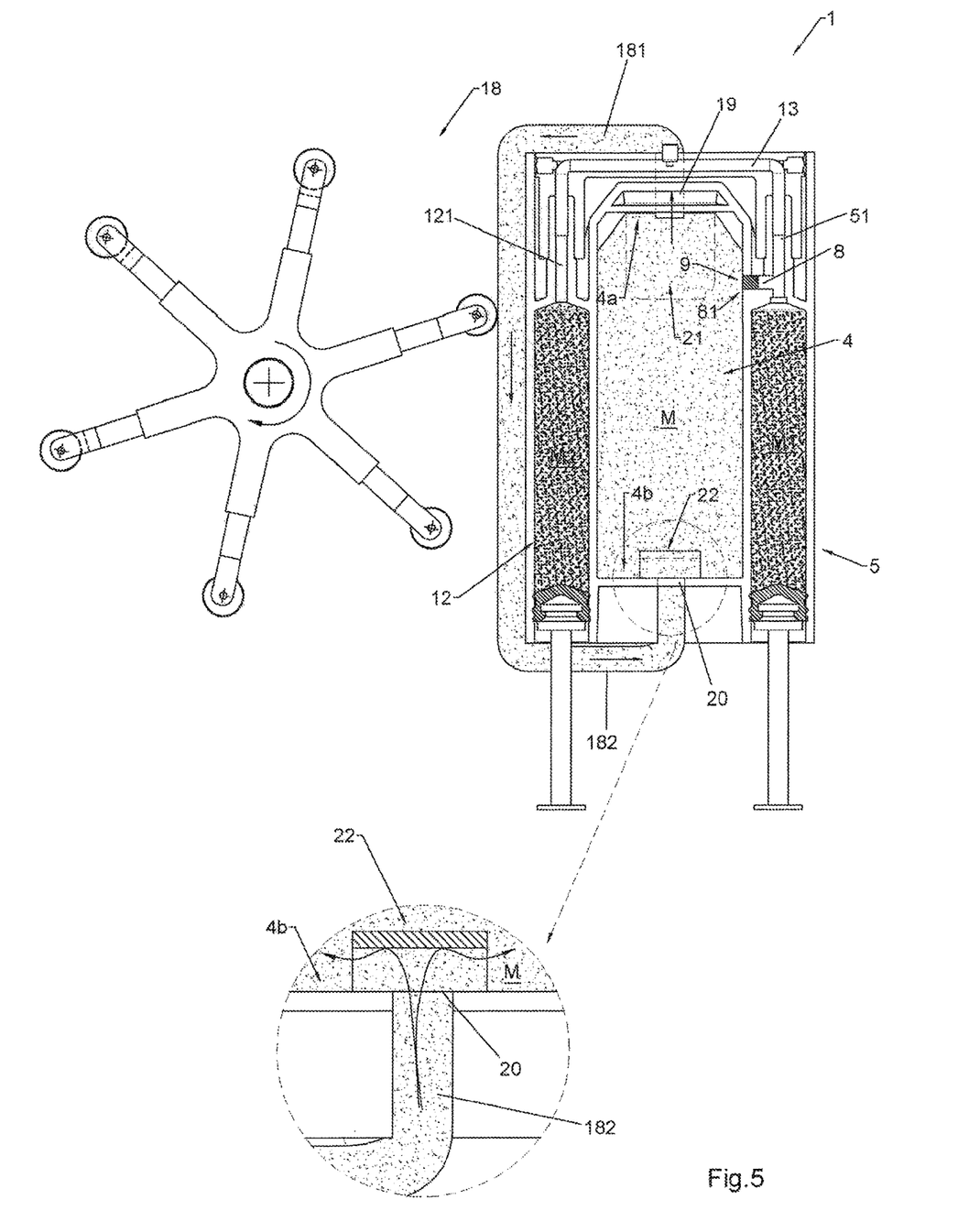
FIG. 5 shows the cartridge of the invention according to the first embodiment of the invention, provided with a recirculation pump.

Preferably, the cartridge 2 of the invention comprises also a pump 18, preferably a pump of the peristaltic type, schematically shown in FIG. 5 and operatively connected to a suction mouth 19 defined at the level of a first end 4a of the container 4 with its suction duct 181 and to a delivery mouth 20 defined at the level of a second end 4b of the same container 4, opposite said first end 4a, with its delivery duct 182, respectively.

Said pump 18 is advantageously configured so as to allow the recirculation and the mixing of the material M present inside the container 4.

According to a variant embodiment, said peristaltic pump 18 may not be present or may belong to the stereolithography machine 200 in which the cartridge 1 of the invention is suited to be installed. In this case, obviously, the cartridge 1 of the invention and the pump 18 should be provided with convenient complementary connection means, in such a way as to allow a removable operative connection to be obtained between the same pump 18 and the cartridge 1 when the latter is installed in the stereolithography machine 200.

Preferably, the cartridge 1 of the invention, in association with said pump 18, allows also for the creation of a depression 21 on the bottom 2 of the container 4 in proximity to the suction mouth 19. In this case, the suction mouth 19 defined in the container 4 is substantially provided at the height of the depression 19, as shown in the section view of FIG. 3.

Advantageously, the presence of the depression 21 guarantees that during the pumping operation the suction mouth 19 will be completely submerged by the material M present inside the container 4. This therefore prevents the pump 18 from sucking in air in addition to said material M.

Furthermore, the container 4 preferably comprises a baffle element 22, preferably a wall arranged orthogonally with respect to the bottom 2 which faces the delivery mouth 20 inside the container 4.

The baffle element 22 is advantageously configured in such a way as to deviate the flow of the material M out of the delivery mouth 20 and allow the same material M to reach also the areas of the container 4 which are arranged laterally with respect to said delivery mouth 20, as schematically illustrated in the detail of FIG. 5.

Among the other things, it is important to point out that the solution just described above, according to which the pump 18, the depression 21 and the baffle element 22 are combined together, could be itself the subject of a claim, with no need to implement said solution in a cartridge 1 according to the preferred embodiment of the invention or according to the alternative embodiments described above. In fact, said last combination of features allows per se the achievement of the advantages just described above.

Regarding the shutter means 9, these preferably comprise a valve body 91 configured to be slidingly introduced into the delivery mouth 81 between a first position, according to which the same valve body 91 prevents the passage of the material from the first reservoir 5 to the container 4, and a second position, according to which the valve body 91, instead, allows the same material to flow between said two elements 5 and 4. As shown in the detail of FIG. 1, said valve body 91 is operatively connected to an elastic element 92 which develops substantially in the longitudinal direction. In particular, said elastic element 92 is operatively connected to the valve body 91 at the level of a first one of its ends 92a and is operatively connected to an anchorage point defined on the cartridge 1 with its second end 92b, opposite said first end 92a, in such a way as to allow the movement of the valve body 91 from said first position to the second position, and vice versa.

Figure 6:
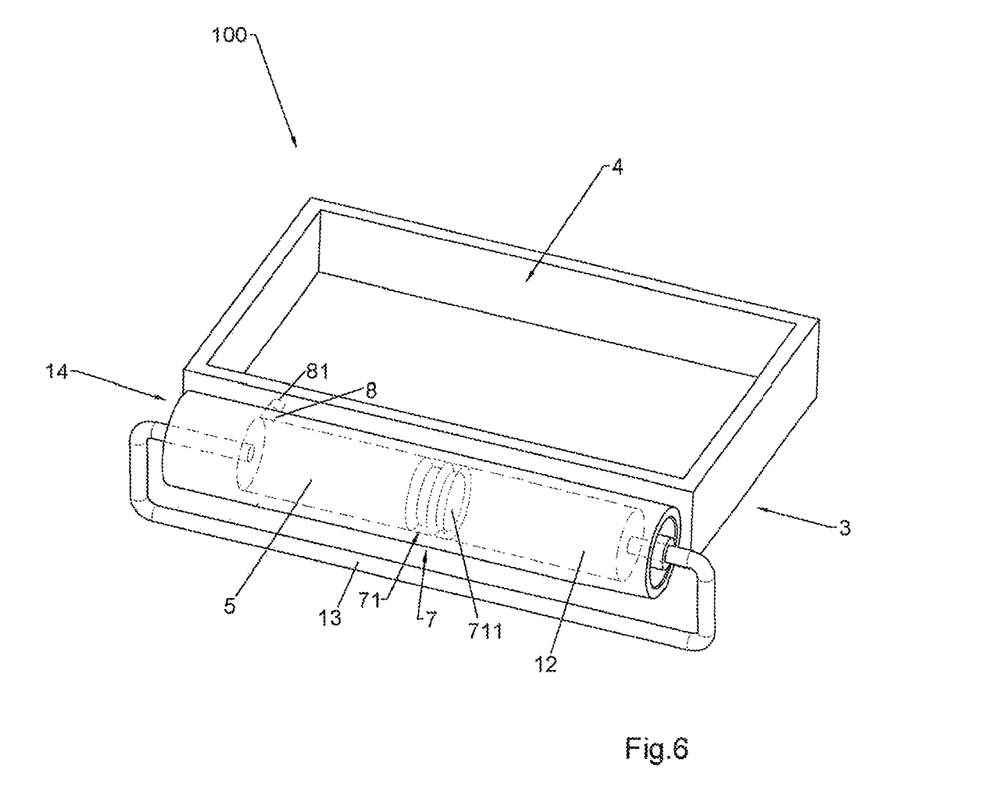
FIG. 6 shows an axonometric view of the cartridge of the invention according to a second embodiment.
Figure 7:
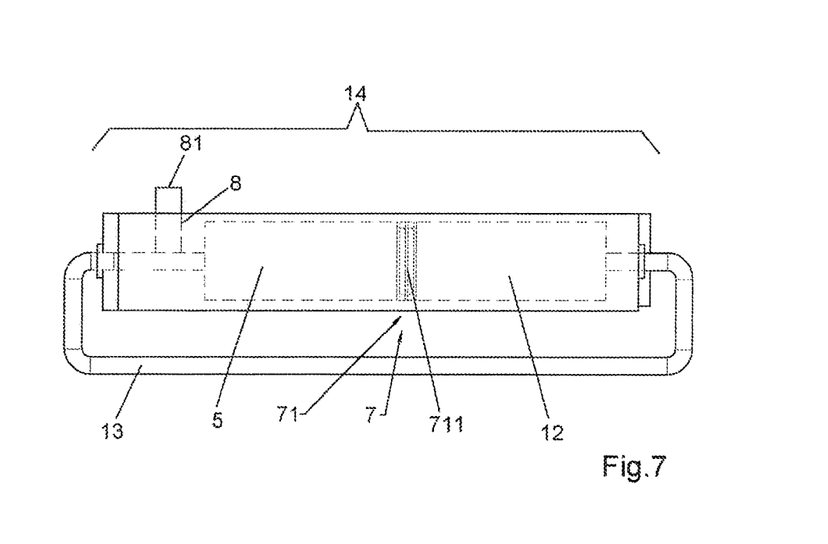
FIG. 7 shows a detailed view of the structure of the reservoirs belonging to the cartridge illustrated in FIG. 6.

A second preferred embodiment of the cartridge of the invention, schematically represented in FIGS. 6 and 7, where it is indicated as a whole by 100, differs from said first preferred embodiment, including all the variant embodiments described above, in that the first reservoir 5 and the second reservoir 12 are defined in a single body 14 substantially in the shape of a hollow cylinder, while the feeding unit 7 comprises single pushing means 71, in particular a single plunger 711, arranged and suited to slide inside said hollow cylindrical body 14.

Furthermore, according to said second embodiment, the feeding unit 7 comprises a single actuator configured to move the pushing means 71, preferably the plunger 711, along said hollow cylindrical body 14.

Obviously, according to said variant embodiment of the invention, as shown in FIG. 7, the two reservoirs 5 and 12, defined in the same hollow cylindrical body 14, are fluid-dynamically isolated from each other through said plunger 711 which by moving varies their internal volumes so that they are complementary to each other.

As already mentioned above, the invention includes also the stereolithography machine 200 having the characteristics described above. In particular, the stereolithography machine 200 comprises emitter means 203 suited to emit the predefined radiation R and a modelling platform 202 associated with power means suited to move it along a trajectory of movement X. According to the invention, the stereolithography machine 200 comprises said connection means 201 suitable for the insertion and operating connection of a cartridge 1, 100 according to the invention.

Preferably but not necessarily, in said stereolithography machine 200 the connection means 201 are configured so that said cartridge 1, 100 can be arranged in an oblique position with respect to the horizontal plane on which the stereolithography machine 200 rests.

In practice, the cartridge 1, 100 is associated with the machine 200 in such an operating position that the transparent bottom 2 of the container 4 is arranged along the trajectory of the predefined radiation R and that the access opening 11 is arranged along the trajectory of movement X of the modelling platform 202.

The three-dimensional object is produced through a stereolithography process of the known type, after transferring a predefined quantity of one or more materials M1, M2 from the reservoirs 5, 12 to the container 4.

In particular, supposing that the cartridge 1 according to the first preferred embodiment illustrated in FIGS. 1 and 2 be used to make a dental prosthesis with the external surface characterized by a variable colour tone, a first material M1, to be used as a base material, should be placed inside the first reservoir 5 and a second material M2, comprising coloured pigments, should be placed inside the second reservoir 12.

Therefore, in the situation described above, according to the stereolithography process carried out through the stereolithography machine 200, first of all the shutter means 9 are arranged in said second position, in such a way as to allow the first material M1 to flow out of the delivery mouth 81. Preferably, the shutter means 9 are moved by an actuator element, in particular a mechanical finger not illustrated in the figures, belonging to the stereolithography machine 200 and operatively associated with said shutter means 9.

Figure 8:
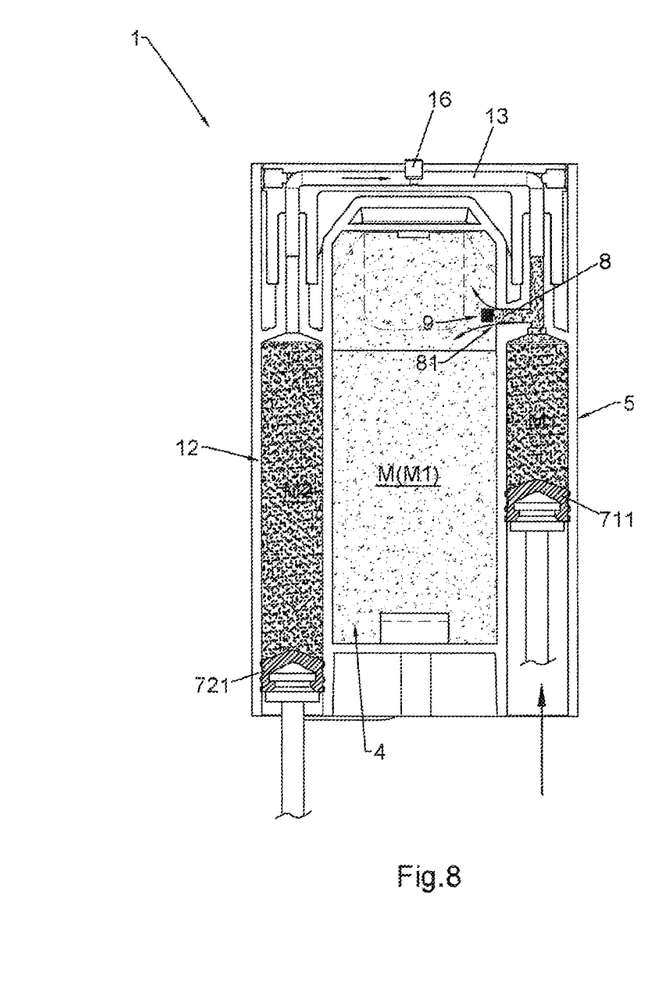
FIG. 8 illustrates the step in which a first material is conveyed into the container of the cartridge of the invention according to said first embodiment.

Successively, according to the stereolithography process the first plunger 711 of the cartridge 1 is operated through said first actuator means in such a way as to convey the first material M1 towards said delivery mouth 81, while at the same time maintaining the second plunger 721 stationary, as schematically shown in FIG. 8.

This last solution advantageously prevents the first material M1 from being conveyed towards the second reservoir 12 through the second duct 13.

In addition to the above, since the cartridge 1 according to the preferred embodiment of the invention includes said closing element 16, it is further guaranteed that the first material M1 and the second material M2 will not be contaminated.

The action of the first plunger 711 is preferably stopped when the first material M1, which in this specific case serves as base material M, is completely conveyed into the container 4. In case of need, before the execution of the actual stereolithography process for the creation of the three-dimensional object, it may be required that said base material contained in the container 4 be mixed, preferably through the activation of the peristaltic pump 18.

Once the above operations have been carried out, the production of the three-dimensional object can be started, by placing the modelling platform 202 in contact with the material present in the container 4.

A layer of the material placed in contact with the modelling platform 202 is then selectively irradiated with the predefined radiation R, in such a way as to cause it to solidify.

Successively, the modelling plate 202 is lifted, in order to allow the same material to be prepared for making the second layer.

In particular, in the case at hand said step of preparing the material includes the operation of conveying a given quantity of the second material M2 containing the coloured pigments into the container 4, in such a way as to mix it with said base material M already present in the same container 4, in order to actually modify its colour and/or shade.

Figure 9:
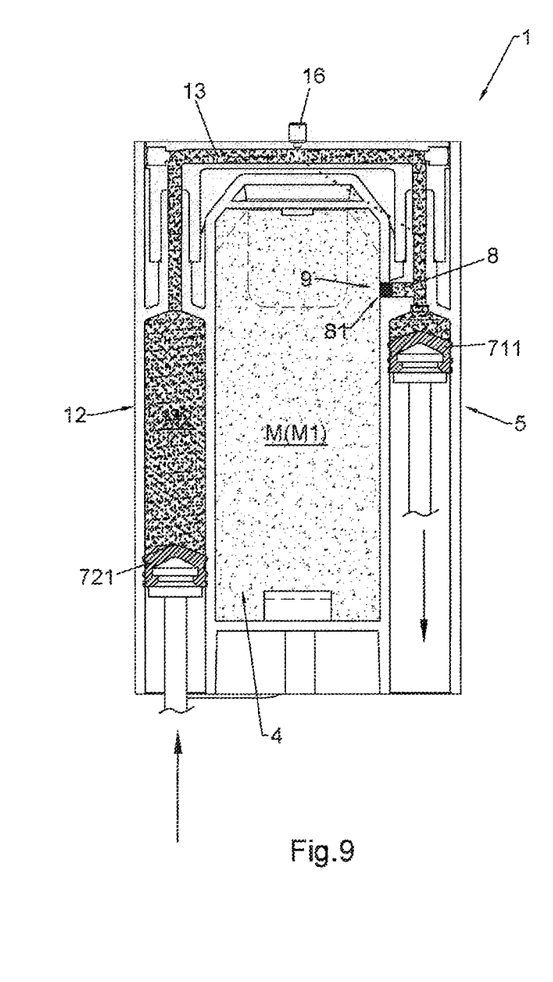
FIGS. 9 to 11 show the steps of the mixing method of the invention implemented using the cartridge of the invention according to said first embodiment.
Figure 10:
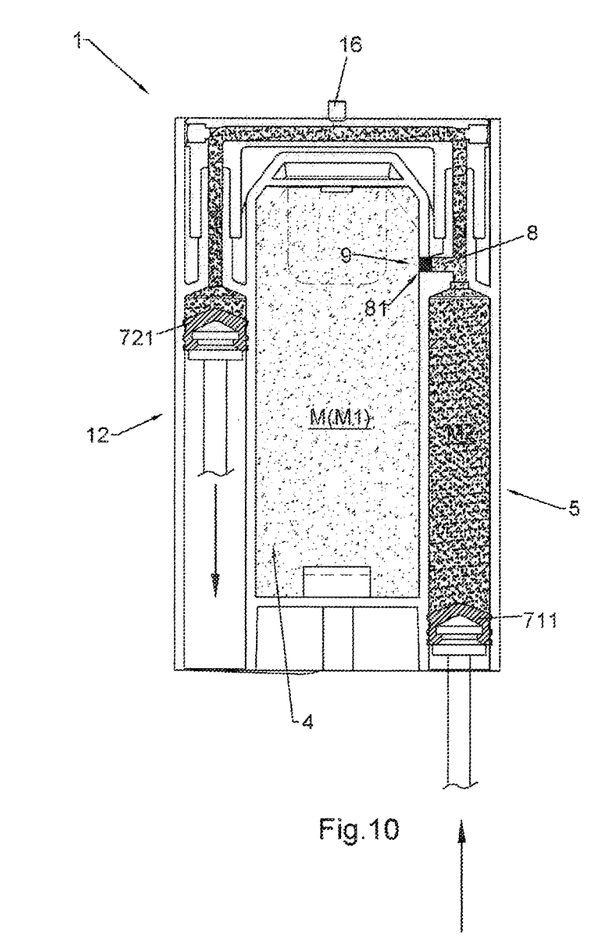

Since, as already explained above, the heavier components of the second material M2 present inside the second reservoir 12 may be deposited on the bottom and may therefore be separated from the more liquid components, before proceeding to said conveying operation it is necessary to mix the second material M2 through the application of the mixing method of the invention, the operating steps of which are described below. In greater detail, according to the method of the invention, the shutter means 9 are placed in their first operating position, as previously described, in such a way as to prevent the flow of material through the delivery mouth 81. In the case where also said closing element 16 is provided, this must obviously be removed, too, in order to allow the flow of the material through the second duct 13. At this point, according to the mixing method of the invention the feeding unit 7 is operated in such a way as to convey the second material M2 from the second reservoir 12 to the first reservoir 5 and successively to convey it in the opposite direction from the first reservoir 5 to the second reservoir 12. More precisely, in the case of the cartridge 1 according to the first preferred embodiment, as schematically shown in FIG. 9, during said operating action the second plunger 721 is pushed into the second reservoir 12 and at the same time the first plunger 711 is extracted from the first reservoir 5, in such a way as to facilitate, in fact, the operation of conveying the second material M2 from said second reservoir 12 to the first reservoir 5. In a symmetrical manner, in order to convey the second material M2 from said first reservoir 5 to the second reservoir 12, the first plunger 711 is pushed into the first reservoir 5 and at the same time the second plunger 721 is extracted from the second reservoir 12, as schematically shown in FIG. 10.

According to the method of the invention, said two operations are repeated in sequence until achieving a convenient degree of homogeneity of said second material M2.

Once said mixing operation has been completed, according to the method of the invention, in the case where the second material M2 should be inside the second reservoir 12, the same material would be conveyed for the last time into the first reservoir 5, the latter being provided with said delivery mouth 81. Successively, according to the mixing method, the feeding unit 7 is stopped and the delivery mouth 81 is opened, in sequence, by positioning the shutter means 9 in said second operating position, and the feeding unit 7 is then operated again, this time in order to allow at least a portion of said second material M2 to be conveyed through the delivery mouth 81 from the first reservoir 5 into the container 4. The quantity of material introduced in the container 4 depends on the colour tone that has to characterize the material inside the container 4 itself.

Figure 11:
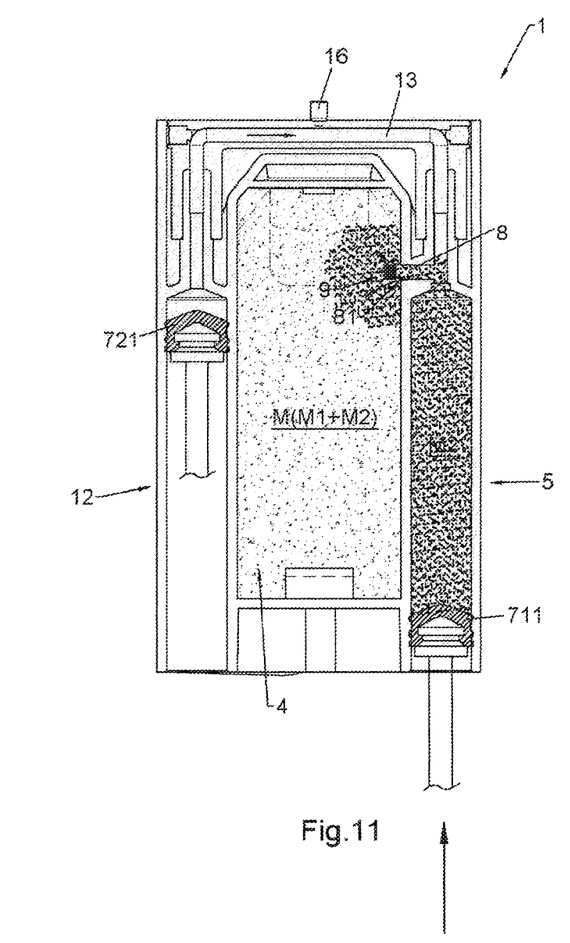

In the case of the first preferred embodiment of the cartridge 1 of the invention, during this last conveying operation, as shown in FIG. 11, the second plunger 721 is placed completely inside the second reservoir 12 and the first plunger 711 is made advance inside the first reservoir 5 by a distance which is proportional to the predefined quantity of the second material M2 to be conveyed into the container 4. Advantageously, the fact of placing the second plunger 721 completely inside the second reservoir 12 prevents the second material M2 from flowing into the same second reservoir 12 through the second duct 13 when pushed by the first plunger 711, and consequently makes it possible to achieve a higher degree of precision when delivering the same material M2 into the container 4.

At the end of the execution of said mixing method of the invention, the stereolithography machine 200 proceeds to make the second layer of the three-dimensional object, placing the modelling platform 202 in contact with the material present in the container 4 again and selectively irradiating the layer defined in this way with the predefined radiation R, in such a way as to cause it to solidify.

As is known, during the stereolithography process a plurality of superimposed layers are solidified in such a way as to define the three-dimensional object.

Preferably, the mixing method of the invention is executed between the creation of each individual layer and the creation of the successive layer.

It cannot be excluded, however, that said mixing method may be executed following the creation of a predefined number of layers or whenever the operator deems it convenient to employ it.

In any case, the execution of said method of the invention makes it possible to obtain the optimal mixing of a material before its introduction into the container 4.

In this way, it is possible to avoid the risk of introducing into the container 4 only the more liquid components of a material, in this case of the second material M2, and of leaving the heavier components inside the second reservoir 12.

According to the above, it can be understood that the cartridges described above achieve the set objects.

In particular, the invention achieves the object to make it simpler for the operator to use different materials in the same stereolithography machine.

The invention also achieves the object to prevent the material introduced in the processing container from having mechanical and colour characteristics and other physical parameters different from the original ones of the material itself. In particular, the invention achieves the object to allow the effective mixing of the material suited to be introduced in said container before proceeding to the production of the three-dimensional object.

The invention claimed is:

1. A cartridge for a stereolithography machine, of the type comprising:
   a supporting structure provided with a connector configured to removably connect the cartridge to said stereolithography machine;
   a first reservoir suited to contain a liquid or pasty material suited to be solidified through exposure to predefined radiation, said first reservoir being provided with a first duct and with a delivery mouth which are suited to place said first reservoir in communication with a container;
   a feeding unit suited to feed said liquid or pasty material from said first reservoir to said container;
   a shutter configured to close said delivery mouth of said first duct;
   at least one second reservoir configured to contain said liquid or pasty material;
   at least one second duct interposed between said first reservoir and said at least one second reservoir in such a way as to place said first reservoir in communication with said at least one second reservoir;
   said feeding unit being configured to convey said liquid or pasty material from said first reservoir to said at least one second reservoir and vice versa through said at least one second duct when said shutter is in a first position in which the shutter closes said delivery mouth.

2. The cartridge according to claim 1, wherein:
   said first reservoir and said at least one second reservoir are defined in a single body substantially in a shape of a hollow cylinder;
   said feeding unit comprises a plunger slidable inside said single body and a first actuator configured to move said plunger along said single body.

3. The cartridge according to claim 1, wherein:
   said first reservoir and said at least one second reservoir are defined so that they are distinct from each other, both being substantially in a shape of a hollow cylinder; and
   said feeding unit comprises a first plunger slidable inside said first reservoir as well as a first actuator configured to move said first plunger along said first reservoir and a second plunger slidable inside said at least one second reservoir as well as a second actuator configured to move said second plunger along said at least one second reservoir.

4. The cartridge according to claim 1, wherein said at least one second duct is removably connected to a first connection element defined on said first reservoir and to a second connection element defined on said at least one second reservoir.

5. The cartridge according to claim 1, wherein the cartridge further comprises a removable plug arranged along said at least one second duct in order to prevent passage of said liquid or pasty material from said first reservoir to said at least one second reservoir and vice versa.

6. The cartridge according to claim 1, wherein the cartridge further comprises said container and wherein said container comprises an access opening and a bottom which is at least partially transparent and located opposite said access opening.

7. The cartridge according to claim 6, wherein the cartridge further comprises a pump operatively connected, respectively, to a suction mouth arranged at a first height at a first end of said container with a suction duct and to a second delivery mouth arranged at a second height at a second end of said container, opposite said first end, with a delivery duct, and wherein said pump is configured to allow recirculation and mixing of said liquid or pasty material inside said container.

8. The cartridge according to claim 7, wherein said pump is a peristaltic pump.

9. The cartridge according to claim 7, wherein the cartridge further comprises:
   a depression created on the bottom of said container adjacent said suction mouth, said suction mouth being defined substantially at a height of said depression; and
   a baffle element facing the second delivery mouth of said container.

10. The cartridge according to claim 1, wherein said shutter comprises:
   a valve body configured in such a way that the valve body can be slidingly introduced into said delivery mouth between the first position and a second position in which the valve body allows the flow of said liquid or pasty material between said first reservoir and said container; and
   an elastic element substantially developing longitudinally and operatively connected to said first valve body with a first end and to an anchorage point defined on said cartridge with a second end, opposite said first end.

* * * * *